United States Patent [19]

Hemmingsen

[11] Patent Number: 5,002,250
[45] Date of Patent: Mar. 26, 1991

[54] PLATEN FOR AN ORIGINAL

[75] Inventor: Hans Hemmingsen, Birkerod, Denmark

[73] Assignee: Eskofot A/S, Ballerup, Denmark

[21] Appl. No.: 401,844

[22] Filed: Sep. 1, 1989

[30] Foreign Application Priority Data

Sep. 5, 1988 [DK] Denmark .................... 4928/88

[51] Int. Cl.$^5$ ............................................. A45P 42/14
[52] U.S. Cl. ......................................... 248/363; 355/73
[58] Field of Search .................. 248/363, 362; 355/73, 355/85, 76, 91; 269/21, 22, 20

[56] References Cited

U.S. PATENT DOCUMENTS

| | | | |
|---|---|---|---|
| 3,115,808 | 12/1963 | Durst | 248/363 X |
| 3,644,039 | 2/1972 | Boyer | 355/85 |
| 3,645,621 | 2/1972 | Wally | 355/73 X |
| 3,693,924 | 9/1972 | Blatherwick | 248/363 |
| 3,844,461 | 10/1974 | Robison | 355/73 X |
| 4,423,851 | 1/1984 | Heitmann | 248/362 |
| 4,676,633 | 6/1987 | Burgess | 355/73 X |
| 4,903,075 | 2/1990 | Kinoshita | 355/73 X |

FOREIGN PATENT DOCUMENTS 71950 12/1950 Denmark ........................ 248/362

*Primary Examiner*—J. Franklin Foss
*Attorney, Agent, or Firm*—Cushman, Darby & Cushman

[57] ABSTRACT

An apparatus for scanning a transparent platen including a relatively rigid plate of transparent material. In use, an original document sheet from which data are to be acquired by examination of the document through the plate is retained against the bottom side of the rigid plate of transparent material, by suction, which is applied to the interface between the original document sheet and the plate about the perimeter of the original document sheet, near the outer the edge of the relatively rigid plate. Alternatively, the original may be placed on an exchangeable, elastic support plate of transparent material retained to the relatively rigid plate by suction. Since the support plate is removable, it can be mounted on a light board, thus allowing a digitizer to determine the area to be scanned. The support plate is preferably rather thin so that it can sealingly abut originals of varying thickness.

3 Claims, 5 Drawing Sheets

PLATEN FOR AN ORIGINAL

FIELD OF THE INVENTION

The invention relates to a transparent platen for carrying an original comprising a relatively rigid plate of transparent material.

BACKGROUND ART

Previously, three stacked plates were used, the original being retained between two of said plates. A disadvantage of such an arrangement was the difficult cleaning the bottom side of the undermost plate. Furthermore, Newton rings appeared when the plates were clamped together.

SUMMARY OF THE INVENTION

The object of the invention is to provide a platen where the above-mentioned disadvantages are avoided. The platen according to the invention is characterised in that the original is retained at the bottom side of the rigid plate of transparent material by a suction means along the edge of the relatively rigid plate. Thus, evacuation is sufficient to allow the use of only a loose middle plate since the middle plate or optionally only the original are sucked to the superjacent transparent plate by means of several circumferential, sealing beads.

BRIEF DESCRIPTION OF THE DRAWINGS

The invention is described in greater detail below and with reference to the accompanying drawings, in which.

DETAILED DESCRIPTION OF THE INVENTION

Figure 1:
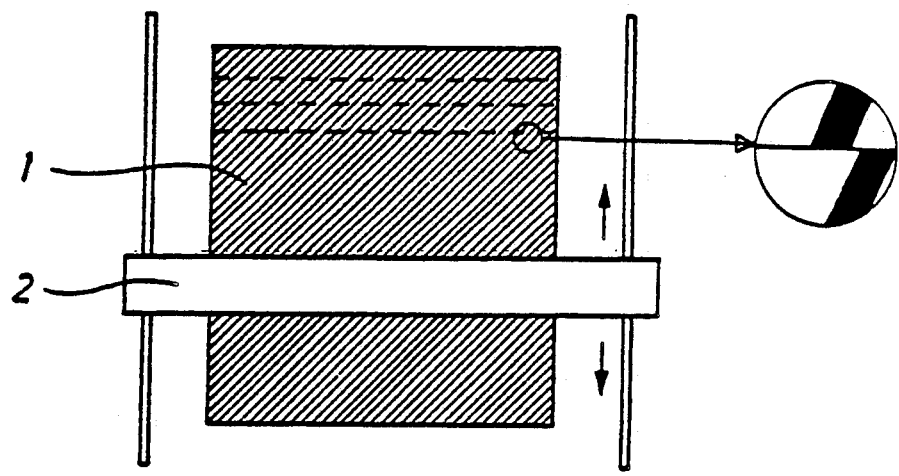
FIG. 1 is a top view of a movable semiconductor camera for scanning an original fastened to a platen.
Figure 2:
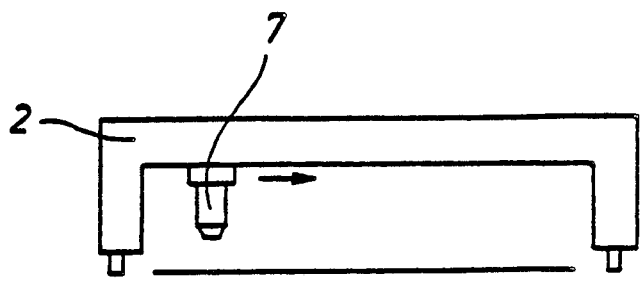
FIG. 2 is a lateral view of the semiconductor camera of FIG. 1.

The scanner of FIGS. 1 and 2 obtains digital data by scanning an original 1 in longitudinal sections by means of a semiconductor camera in form of a CCD array (charged coupled device) comprising a number of semiconductor elements arranged in series. The semiconductor camera comprises 1.024 semiconductor elements in one series. The series of semiconductor elements scans a transverse section of the original 1. The advantage of this type of scanning is an improved resolution without using too many semiconductor elements.

The suspension means of the semiconductor camera 7 can be moved along a transverse portal-shaped means 2 displaceable in longitudinal direction, cf. FIG. 1. Distorted nuts are employed to avoid fogging. However, the glass plate 11 covering the original is not planar. It is impossible to produce a completely planar glass plate. Its thickness is, on the other hand, relatively uniform. It was thus conceived to let the CCD camera 7 float over the glass plate 11 on an air cushion. As a result the desired distance between the camera 7 and the glass plate 11 can be kept constant The concept is realised by means of an air cushion unit suspended on gimbals so that the floating height is easily adapted to existing unevennesses, cf. FIG. 4. Moreover, the unit is suspended by two parallel plates 4 ensuring the parallelity of said unit (parallelogram suspension) and avoiding fogging of the sides. The floating height is approx. 0.06 mm. Dry, clean air is blown onto the surface to be scanned.

The air-cushion unit has the shape of an annulus 5 with openings 6 along its rim. Moreover, light is supplied from above to the glass plate 11 via one or more optical fibers. Optionally light can also be supplied from below. The signals from the suspended CCD camera 7 are transmitted to an amplifier and an A/D converter, and from the converter to processors.

Figure 3:
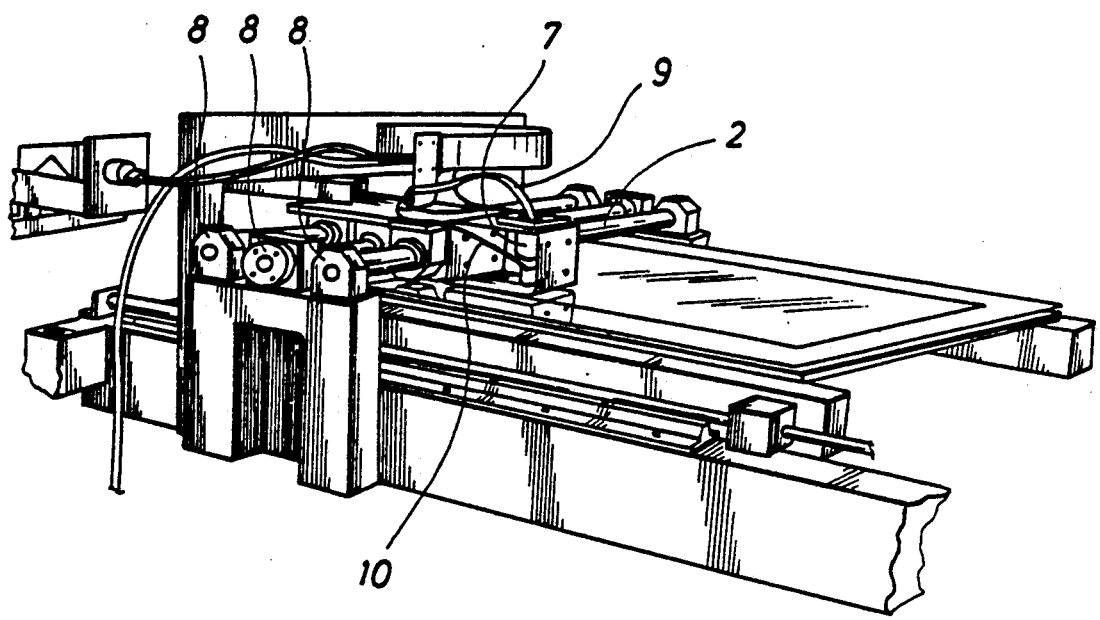
FIG. 3 is a perspective view of the semiconductor camera of FIG. 1.

FIG. 3 is a perspective view of the platen, showing the portal-shaped means 2 longitudinally displaceable as indicated in FIG. 1. The entire suspension means for the CCD camera 7 is displaceable along the portal-shaped means 2, as indicated in FIG. 2, and is kept in place by firmly fixed guideways 8 of the portal-shaped means 2. FIG. 3 also shows tubes 9 for the supply of pressurized air and optical fibers 10 for illuminating the area to be scanned by the CCD camera 7.

Figure 4:
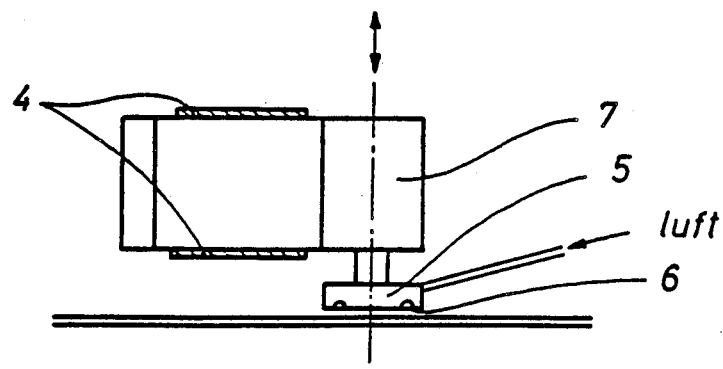
FIG. 4 illustrates the suspension of the semiconductor camera.

FIG. 4 is a perspective view of the suspension arrangement, showing a leaf spring suspension 4 forming parallel guidesways.

Figure 5:
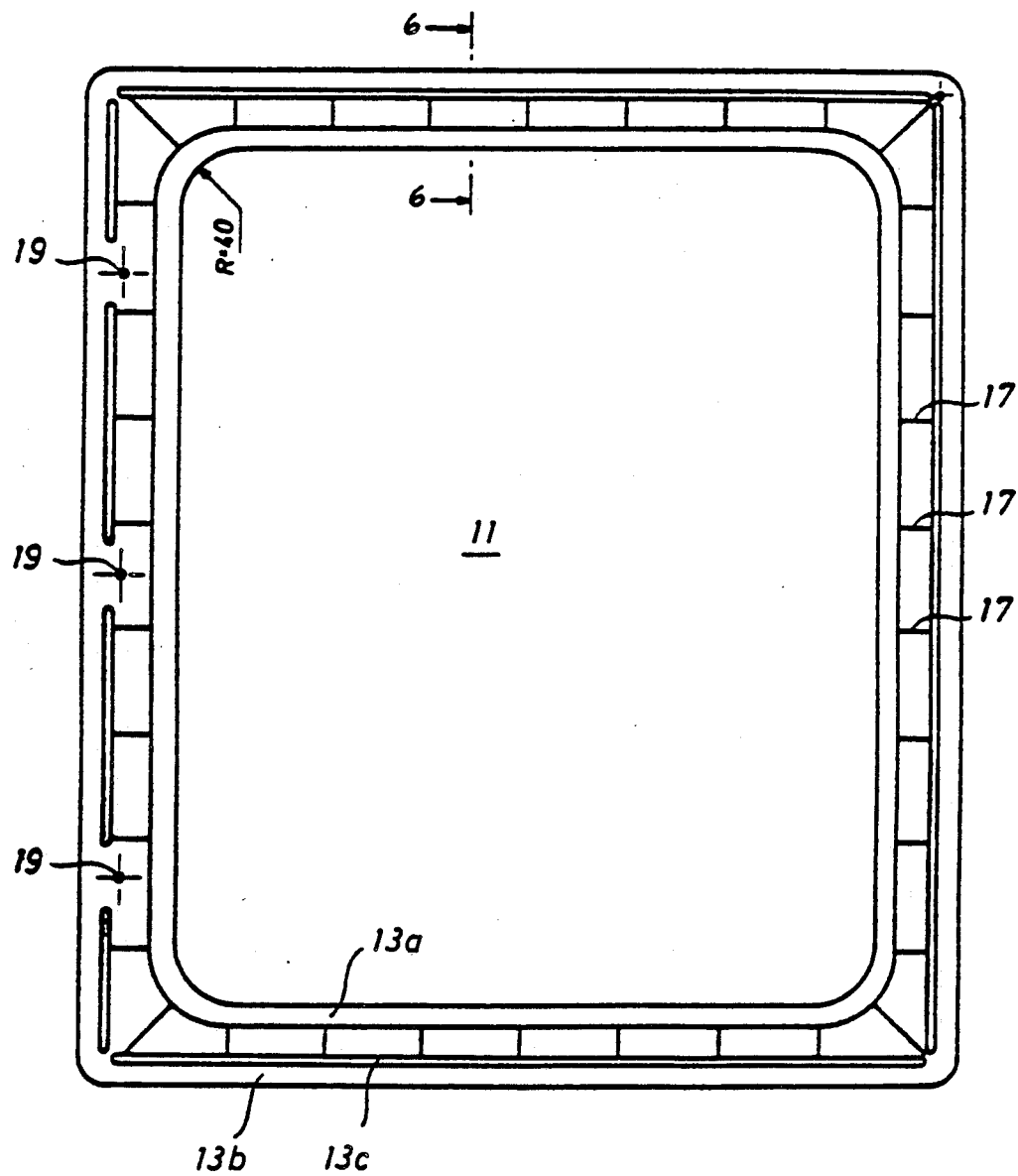
FIG. 5 is a top view of the platen according to the invention.
Figure 6:
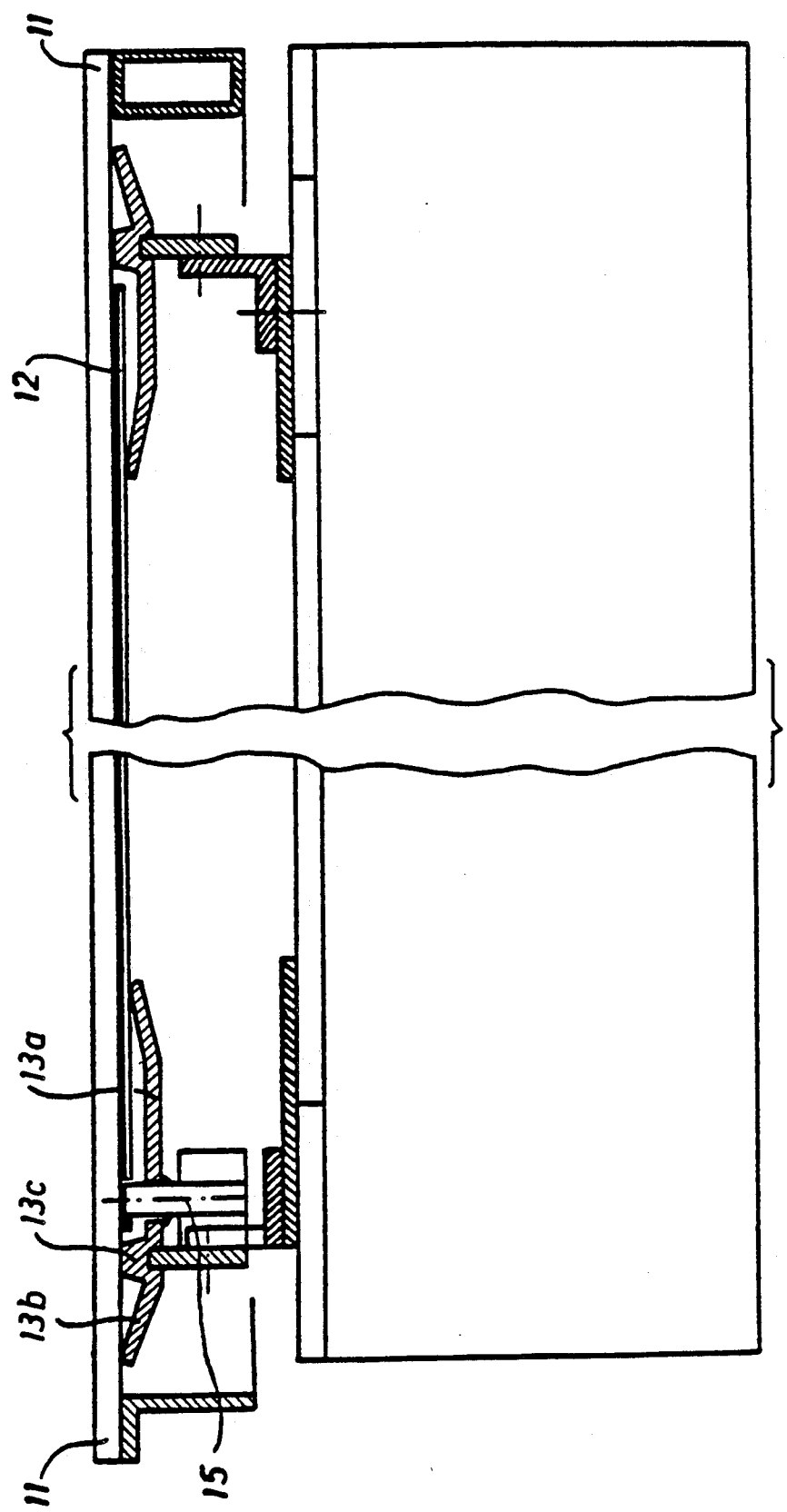
FIG. 6 is a sectional view of the platen of FIG. 5 along the line 6—6.

FIG. 5 is a top view of the platen comprising a relatively rigid plate 11 of transparent material. The original or an elastic plate 12 to which the original is fastened can be retained to the bottom side of the frigid plate 11 by means of a circumferential suction means 13a, 13b, 13e arranged along the edge of the rigid plate 11. The suction means comprises an inwardly facing, circumferential sealing bead 13a and an outwardly facing, circumferential sealing bead 13b, cf. FIG. 6. Both beads are made of rubber. The inner bead 13a is supported at 14 so that it is pressed against the elastic plate 12 subjacent the rigid plate 11. The inner bead 13a is provided with internal stiffening ribs 17 to optimize suction. As a result the inner bead 13a sealingly abuts the original along its entire edge. A circumferential projection 13c is arranged between the inner and the outer beads to support the rigid plate 11. The outer bead 13b sealingly abuts the rigid plate 11.

In a particularly advantageous embodiment of the inventive platen, the support plate 12 can be lifted and cleaned and optionally be exchanged. The support plate is fixed to a frame body by means of several pins 19.

Since the support plate 12 is removable, it can be mounted on a light board thus allowing a digitizer to determine the area to be scanned. The support plate 12 is preferably rather thin so that it can sealingly abut originals of varying thickness. The support plate may, for instance, be of a thickness of 2 mm. The support plate and/or the original may be coated with a thin oil film to avoid the appearance of Newton rings.

The inner bead 13a is preferably of a width of approx. 40 mm, while the preferred width of the outer bead 13b is approx. 10 mm. The curvature radius of the corners of the inner bead is at least 40 mm.

The suction piece 15 ending in a suction conduit formed by the circumferential beads 13a, 13b is arranged in such a way that the rigid plate 11 is unable to block suction.

Figure 7:
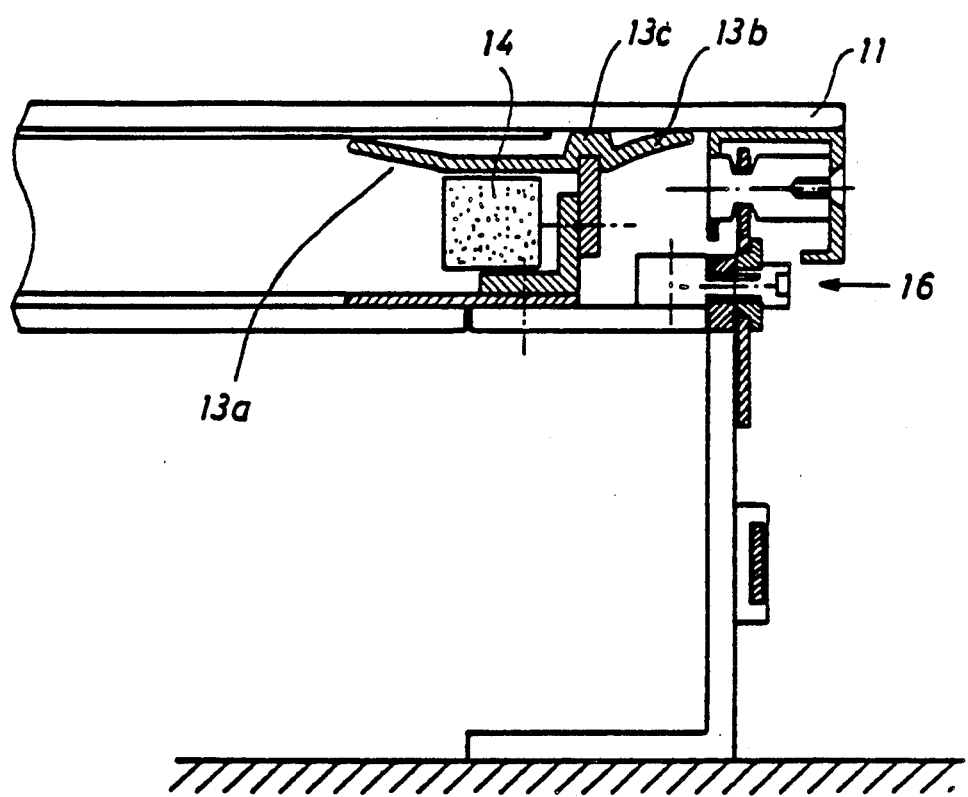
FIG. 7 illustrates the circumferential suction means for retaining the original.

FIG. 7 illustrates, how the superjacent glass plate 11 is tilted upwards by means of a hinge 16, so that the original can be removed. Thus the support plate can be exchanged with another plate, for instance a plate of a different thickness.

As a result there is provided a platen which is simpler than previously known.

In an alternative embodiment the original is arranged in an opening of the support plate and fastened by means of tape.

I claim:

1. A transparent platen for holding an original document sheet on a support while data are being acquired therefrom, comprising:

a substantially rigid plate of transparent material having one face, an opposite face, and an outer perimetrical edge extending thicknesswise of the plate, between said faces; said plate being arranged to permit an original document sheet disposed facewise against said opposite face of said plate to be examined through said one face by data acquisition means;

a ring-shaped vacuum chamber engaged with said opposite face of said plate so as to ring said opposite face adjacent said perimetrical edge; said vacuum chamber including means for mechanically perimetrically supporting an original document sheet in juxtaposition with said opposite face of said plate, and suction means for withdrawing air from between said opposite face of said plate and an original document sheet around the outer perimeter of the original document sheet, when the original document sheet is supported in juxtaposition with said opposite face of said plate by said mechanically perimetrically supporting means;

said mechanically perimetrically supporting means being arranged to support said original document sheet by one of:

direct contact therewith; and indirect contact therewith via an interposed elastic plate.

2. The transparent platen of claim 1, further including:

an elastic plate arranged to be interposed between the original document sheet and the mechanically perimetrically supporting means, so that the mechanically perimetrically supporting means indirectly contacts the original document sheet via said elastic plate.

3. The transparent platen of claim 1, wherein said vacuum chamber includes:

an outer axially projecting perimetrical sealing bead arranged to be pressed directly against said opposite face of said rigid plate;

an inner axially projecting perimetrical sealing bead arranged to be mechanically pressed against one of said original document sheet and said interposed elastic plate;

perimetrically discontinuous rib means located between said inner and outer sealing beads and arranged to be pressed directly against said opposite face of said rigid plate;

a ring-shaped wall means on which said inner and outer sealing beads and said rib means are provided; and a suction conduit extending through said ring-shaped wall means so as to have an opening disposed between said rib means and said inner sealing bead.

* * * * *